(12) United States Patent
Hasegawa

(10) Patent No.: US 11,892,679 B2
(45) Date of Patent: Feb. 6, 2024

(54) FUSION SPLICER

(71) Applicant: Fujikura Ltd., Tokyo (JP)

(72) Inventor: Ryo Hasegawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 559 days.

(21) Appl. No.: 17/270,307

(22) PCT Filed: Feb. 21, 2020

(86) PCT No.: PCT/JP2020/008566
§ 371 (c)(1),
(2) Date: Feb. 22, 2021

(87) PCT Pub. No.: WO2021/079538
PCT Pub. Date: Apr. 29, 2021

(65) Prior Publication Data
US 2022/0011514 A1    Jan. 13, 2022

(30) Foreign Application Priority Data

Oct. 24, 2019  (JP) .................. 2019-193686

(51) Int. Cl.
G02B 6/255    (2006.01)

(52) U.S. Cl.
CPC ......... G02B 6/2553 (2013.01); G02B 6/2555 (2013.01)

(58) Field of Classification Search
None
See application file for complete search history.

(56) References Cited

U.S. PATENT DOCUMENTS

2006/0251374 A1    11/2006   Chou et al.
2016/0266314 A1    9/2016    Miyamori et al.

FOREIGN PATENT DOCUMENTS

| | | |
|---|---|---|
| CN | 103364877 A | 10/2013 |
| CN | 105974520 A | 9/2016 |
| CN | 212134992 U | 12/2020 |
| EP | 2700990 A1 | 2/2014 |
| EP | 3159720 A1 | 4/2017 |
| JP | H06123818 A | 5/1994 |
| JP | H06160662 A | 6/1994 |
| JP | H08194126 A | 7/1996 |
| JP | 2003177268 A | 6/2003 |
| JP | 2004126379 A | 4/2004 |
| JP | 2007298705 A | 11/2007 |

(Continued)

OTHER PUBLICATIONS

International Search Report issued in corresponding International Application No. PCT/JP2020/008566, dated Jun. 26, 2020 (3 pages).

*Primary Examiner* — Chad H Smith
(74) *Attorney, Agent, or Firm* — Osha Bergman Watanabe & Burton LLP

(57) ABSTRACT

A fusion splicer includes: a device main body including a heater that heats a pair of optical fibers that each include a glass part and a coated part; a pair of glass holders each including a groove on which the respective glass part is disposed; a pair of first clamps that each clamp the respective glass part against the respective glass holder; a pair of second clamps that each clamp the respective coated part from above; a third clamp that is fixed to the device main body and that restricts movement of at least one of the optical fibers in a closed state; and a windproof cover that covers the heater, the glass holders, the first clamps, the second clamps, and the third clamp.

6 Claims, 7 Drawing Sheets

(56) References Cited

FOREIGN PATENT DOCUMENTS

| | | | |
|---|---|---|---|
| JP | 2008233228 | A | 10/2008 |
| JP | 5209126 | B1 | 6/2013 |
| JP | 2013109269 | A | 6/2013 |
| JP | 2014119513 | A | 6/2014 |
| JP | 2014238572 | A | 12/2014 |
| KR | 20120099535 | A | 9/2012 |
| KR | 20130140846 | A | 12/2013 |
| KR | 20160110106 | A | 9/2016 |

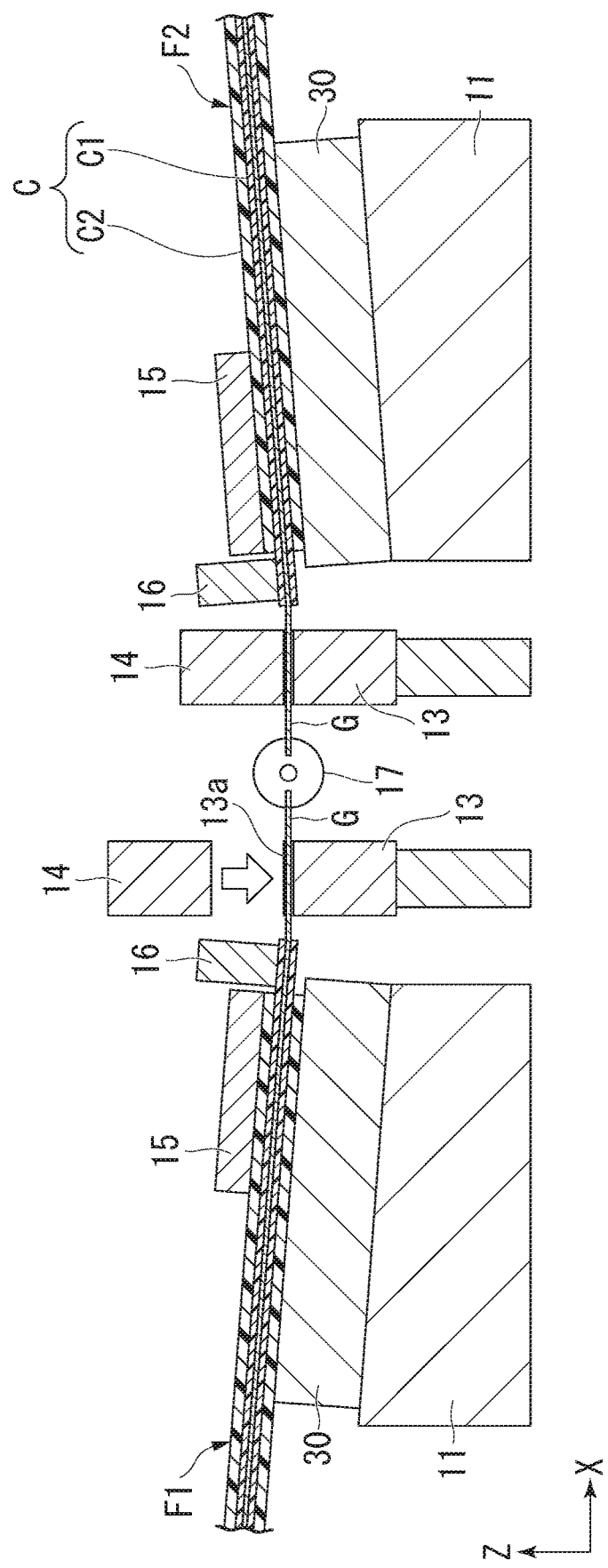

FUSION SPLICER

CROSS-REFERENCE TO RELATED APPLICATIONS

Priority is claimed on Japanese Patent Application No. 2019-193686 filed on Oct. 24, 2019, the content of which is incorporated herein by reference.

TECHNICAL FIELD

The present invention relates to a fusion splicer.

BACKGROUND

Patent Document 1 discloses a fusion splicer in which optical fibers are heated to be fusion-spliced. The fusion splicer includes a first clamp (fiber clamp member) which presses a glass part of an optical fiber, a second clamp (upper clamp member) which presses a coated part of the optical fiber, and a windproof cover which covers the first clamp and the second clamp. When fusion splicing is performed, an optical fiber is in a state in which a portion of the coated part is removed to expose the glass part.

PATENT LITERATURE

[Patent Document 1] Japanese Patent No. 5209126

In a conventional fusion splicer, when a windproof cover is opened and a first clamp and a second clamp are made to retreat from an optical fiber after fusion splicing has been performed, there are cases in which the optical fiber moves freely. If the optical fiber moves freely, an exposed glass part may be damaged by coming into contact with constituent members of the fusion splicer, or the glass part may be bent and cause decrease in reliability of optical transmission.

Particularly, when the first clamp and the second clamp are configured to be opened following the opening of the windproof cover, such an issue becomes more significant.

SUMMARY

The invention provides a fusion splicer in which an optical fiber moving freely even after a windproof cover is opened can be restricted.

A fusion splicer according to one or more embodiments of the invention includes a device main body including a heater which heats a pair of optical fibers, a pair of glass holders on which grooves that places respective glass parts of the pair of optical fibers thereon are formed, a pair of openable and closable first clamps which hold the glass parts between the first clamps and the glass holders, a pair of openable and closable second clamps which press respective coated parts of the pair of optical fibers from above, an openable and closable third clamp fixed to the device main body and configured to restrict movement of at least one of the pair of optical fibers in a closed state, and an openable and closable windproof cover which covers the heater, the pair of glass holders, the pair of first clamps, the pair of second clamps, and the third clamp, in which the device main body includes a cover driver which opens and closes the windproof cover and a clamp driver which opens and closes the pair of second clamps, an opening and closing operation of the pair of first clamps is in conjunction with an opening and closing operation of the windproof cover, and the third clamp is configured to maintain the closed state even after the windproof cover is opened.

According to the above-described embodiments, the state in which the third clamp is closed is maintained even after the windproof cover is opened. Since, the third clamp in the closed state restricts movement of at least one of the pair of optical fibers, the optical fibers moving freely after fusion splicing can be restricted.

Therefore, the exposed glass part being damaged by coming into contact with constituent members of the fusion splicer other than the third clamp, or the glass part being bent and causing decrease in reliability of optical transmission can be restricted.

A closing force of the third clamp may be smaller than a closing force of the second clamp.

The second clamp may include an engaging part which covers at least a portion of the third clamp from above.

The fusion splicer according to the above-described embodiments may further include a switching part which is able to switch an opening and closing operation of the third clamp between a state of being in conjunction with and a state of not being in conjunction with an opening and closing operation of the second clamp.

The third clamp may be positioned between the first clamp and the second clamp in a left-right direction in which the pair of optical fibers extend, the third clamp may come into contact with a first coating layer included in the coated part, and the second clamp may come into contact with a second coating layer included in the coated part and positioned on an outward side of the first coating layer.

The fusion splicer according to the above-described embodiments may further include a controller which controls the cover driver and the clamp driver, in which the controller may be configured to open the windproof cover, the pair of first clamps, and the pair of second clamps by driving the cover driver and the clamp driver after the pair of optical fibers are fusion-spliced, after calculation of a splice loss is performed, or after a proof test is performed.

According to the above-described embodiments of the invention, it is possible to provide a fusion splicer in which an optical fiber moving freely even after a windproof cover is opened can be restricted.

BRIEF DESCRIPTION OF THE DRAWINGS

FIG. 7 is a schematic view of a splicing structure provided in a fusion splicer according to a third embodiment from a front-rear direction.

DETAILED DESCRIPTION

First Embodiment

Hereinafter, a fusion splicer of a first embodiment will be described with reference to the drawings.

Figure 1A:
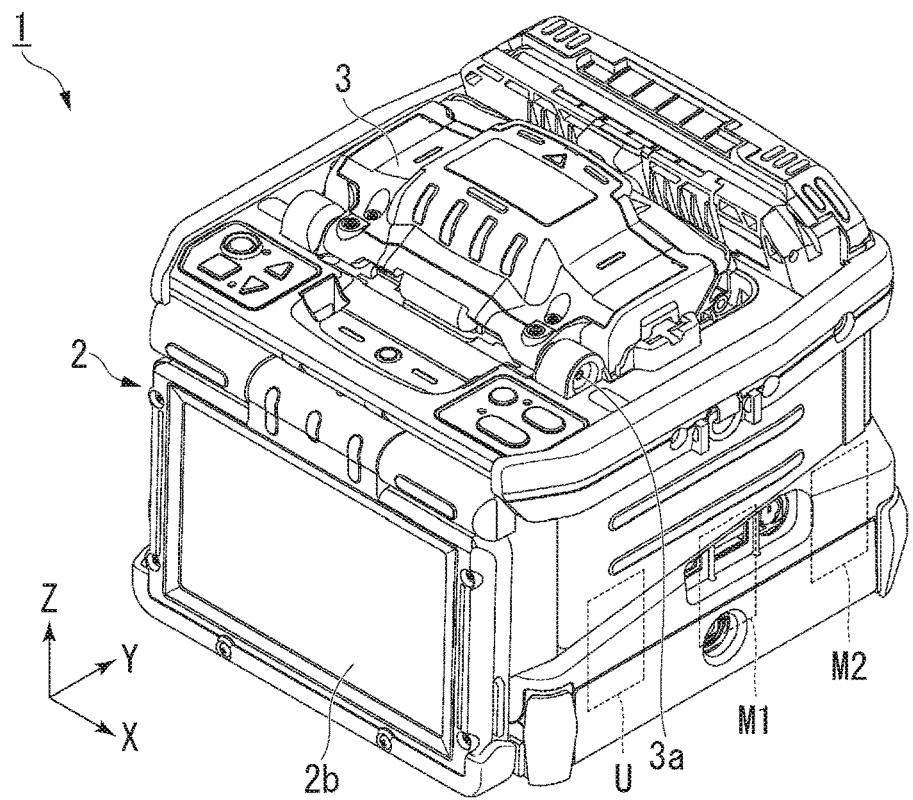
FIG. 1A is a perspective view of a fusion splicer according to a first embodiment.
Figure 1B:
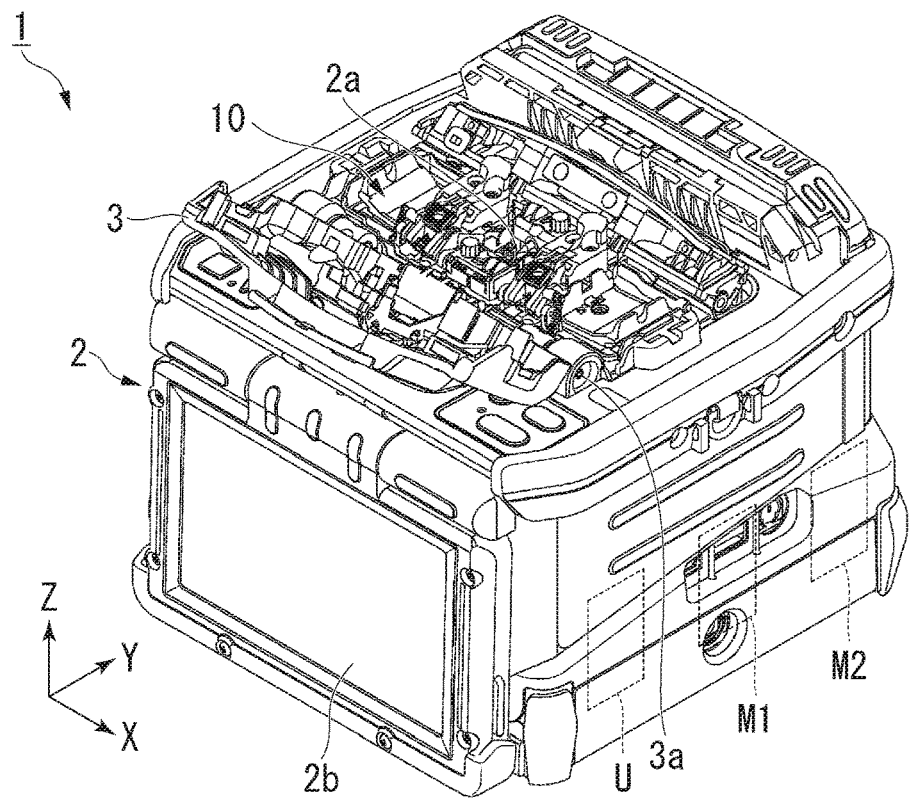
FIG. 1B is a perspective view showing a state in which a windproof cover of the fusion splicer of FIG. 1A is open.
Figure 2:
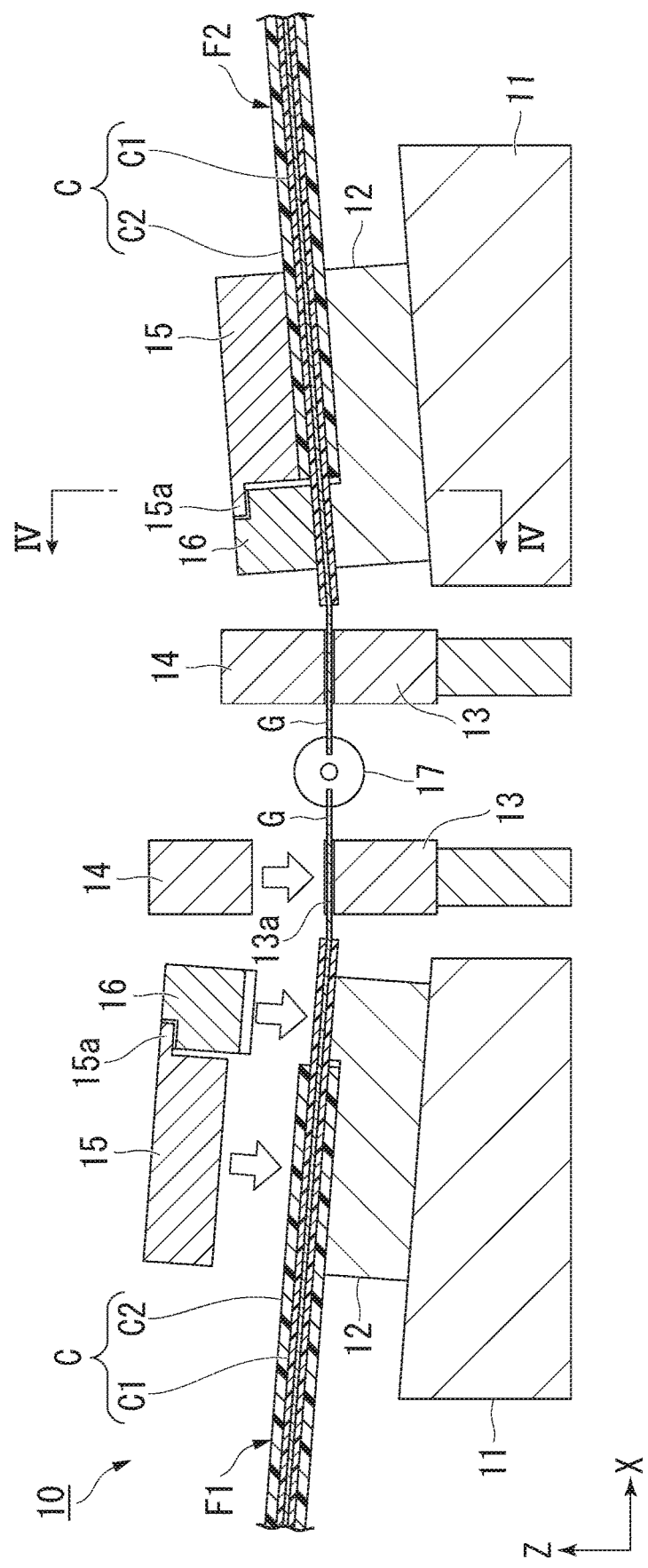
FIG. 2 is a schematic view of a splicing structure provided in the fusion splicer of the first embodiment from a front-rear direction.

As shown in FIGS. 1A, 1B, and 2, a fusion splicer 1 is configured to fusion-splice a pair of optical fibers F1 and F2. Each of the optical fibers F1 and F2 includes a glass part G and a coated part C that covers the glass part G. The coated part C may be formed of a single layer or may be formed of a plurality of layers. The coated part C of the first embodiment includes a first coating layer C1 and a second coating layer C2 that covers the first coating layer C1 from an outward side. The first coating layer C1 and the second coating layer C2 are formed of a resin. Furthermore, the coated part C may include three or more coating layers.

The fusion splicer 1 may be configured to collectively fusion-splice a first optical fiber unit including the optical fiber F1 and a second optical fiber unit including the optical fiber F2. That is, the fusion splicer 1 may fusion-splice single-core optical fibers F1 and F2 to each other or may collectively fusion-splice multicore optical fiber units to each other. That is, "fusion-splicing a pair of optical fibers" includes fusion-splicing multicore optical fiber units.

The fusion splicer 1 includes a device main body 2 having a box shape in an external appearance. A windproof cover 3 is provided in an upper portion of the device main body 2. The windproof cover 3 is rotatable around a rotation center 3a.

As shown in FIG. 1B, when the windproof cover 3 rotates around the rotation center 3a, a splicing structure 10 that fusion-splices the optical fibers F1 and F2 is exposed. The splicing structure 10 includes a heater 2a that heats the optical fibers F1 and F2.

Inside the device main body 2, a controller U, a cover driver M1, and a clamp driver M2 are disposed. The cover driver M1 drives the windproof cover 3, and the clamp driver M2 drives a second clamp 15 (to be described below). The controller U controls the cover driver M1 and the clamp driver M2. A power source such as a motor can be used for the cover driver M1 and the clamp driver M2. As the controller U, integrated circuits such as a microcontroller, integrated circuits (ICs), large-scale integrated circuits (LSIs), and application specific integrated circuits (ASICs), or numerical control (NC) devices or the like can be used. The controller U may control the heater 2a or the like in addition to the cover driver M1 and the clamp driver M2.

Hereinafter, the splicing structure 10 of the first embodiment will be described with reference to FIGS. 2 to 4B. In FIGS. 2 to 4B, each member is shown in a simplified manner for easy understanding of the structure.

Figure 3:
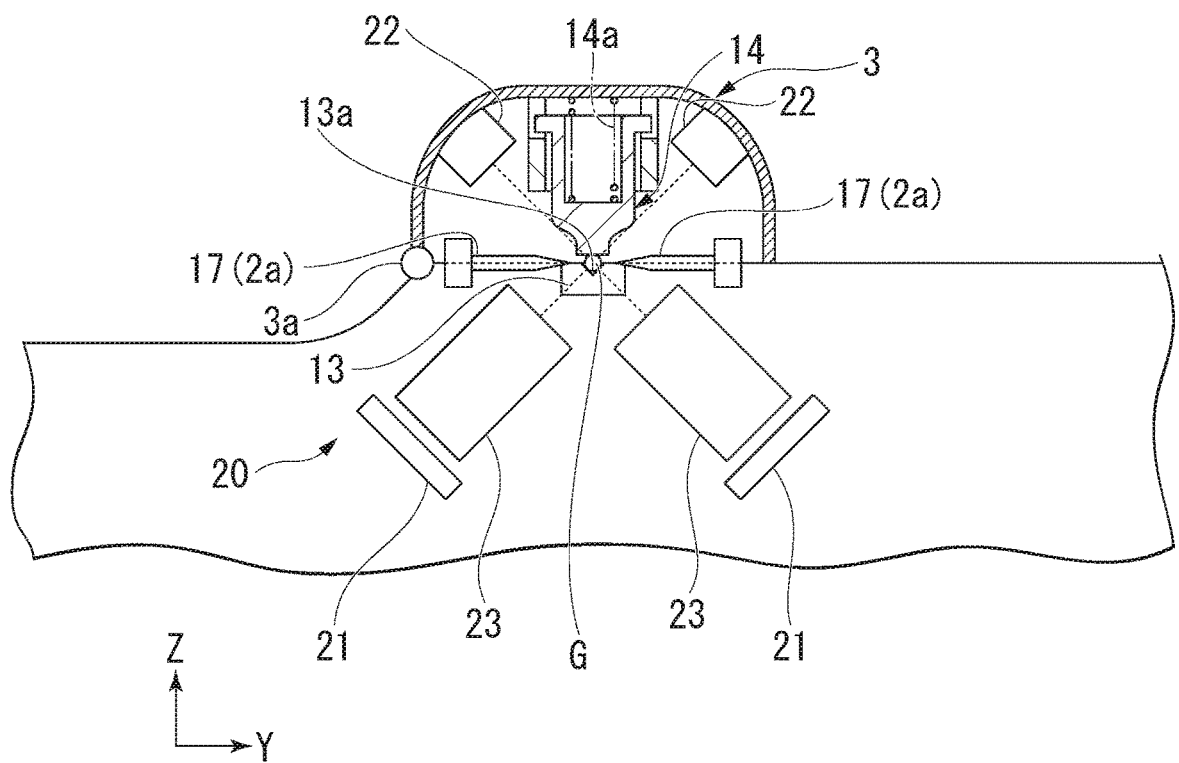
FIG. 3 is a schematic view of the splicing structure provided in the fusion splicer of the first embodiment from a left-right direction.

As shown in FIG. 2, the splicing structure 10 includes a pair of movable stages 11, a pair of lower clamps 12, a pair of glass holders 13, a pair of first clamps 14, a pair of second clamps 15, a pair of third clamps 16, and a pair of electrode rods 17 (see FIG. 3). A direction in which the pair of movable stages 11 face each other and a direction in which the pair of electrode rods 17 face each other are perpendicular to each other.

(Definition of Directions)

In the first embodiment, a direction in which the pair of movable stages 11 face each other is referred to as a left-right direction X and is represented by an X axis. Also, a direction in which the pair of electrode rods 17 face each other is referred to as a front-rear direction Y and is represented by a Y axis. A vertical direction Z perpendicular to both the left-right direction X and the front-rear direction Y is represented by a Z axis.

The left-right direction X is also a direction in which the pair of optical fibers F1 and F2 extend. In the left-right direction X, a side closer to the pair of electrode rods 17 is referred to as an inward side, and a side away from the pair of electrode rods 17 is referred to as an outward side.

The splicing structure 10 has substantially a symmetrical structure in the left-right direction X with the pair of electrode rods 17 as a center.

The pair of movable stages 11 are disposed at a distance from each other in the left-right direction X and are attached to the device main body 2. Each of the pair of movable stages 11 is movable in the left-right direction X with respect to the device main body 2. As shown in FIG. 2, the pair of movable stages 11 are disposed to sandwich the electrode rods 17 therebetween when viewed from the front-rear direction Y. That is, the movable stages 11 can move forward and backward with respect to the electrode rods 17. A power source (not shown, motor or the like) that drives the movable stages 11 is provided in the device main body 2.

The pair of lower clamps 12 are formed in a plate shape and are respectively positioned on an upper side of the movable stages 11. The lower clamps 12 are attachable to and detachable from the movable stages 11. The pair of second clamps 15 are positioned above the lower clamps 12. Also, the pair of third clamps 16 are positioned above the lower clamps 12. The lower clamp 12, the second clamp 15, and the third clamp 16 are fixed to the movable stage 11. Therefore, when the movable stage 11 moves in the left-right direction X, the lower clamp 12, the second clamp 15, and the third clamp 16 also move in the left-right direction X.

The first clamp 14 is positioned above the glass holder 13. The first clamp 14 is configured to open and close an upper surface of the glass holder 13 in conjunction with an opening and closing operation of the windproof cover 3. In the first embodiment, the first clamp 14 is attached to an inner surface of the windproof cover 3 as shown in FIG. 3. Also, a spring 14a that applies a force to the first clamp 14 downward is provided inside each of the pair of first clamps 14. With this configuration, when the windproof cover 3 is closed, the first clamp 14 presses (i.e., clamps) the glass part G of the optical fiber F1 or F2 due to the force applied thereto by the spring 14a. Furthermore, since the glass holder 13 is positioned below the first clamp 14, the glass part G of the optical fiber F1 or F2 is sandwiched between the first clamp 14 and the glass holder 13 by the biasing force generated by the spring 14a.

On the other hand, when the windproof cover 3 is opened, the first clamp 14 is also separated upward from the glass part G.

As described above, the first clamp 14 can switch between a state in which the glass part G is held and a state in which the glass part G is not held in conjunction with the opening and closing operation of the windproof cover 3.

As shown in FIG. 2, the glass holder 13 is positioned between the electrode rod 17 and the lower clamp 12 when viewed from the front-rear direction Y. As shown in FIG. 3, a V-shaped groove 13a that opens upward is formed on the upper surfaces of the glass holder 13. The groove 13a extends in the left-right direction X. Relative positions of the glass parts G are determined when the glass parts G of the optical fibers F1 and F2 are placed on the grooves 13a of the pair of glass holders 13. Furthermore, a shape of the groove 13*a* is not limited to a V-shape, and any shape may be used as long as a position of the glass part G can be determined thereby. For example, the groove 13*a* may be U-shaped or trapezoidal. A material of the glass holder 13 is a material capable of withstanding electrical discharge heating such as, for example, a ceramic.

The second clamp 15 is provided to be rotatable with respect to the lower clamp 12. The second clamp 15 can open and close an upper surface of the lower clamp 12. The second clamp 15 can hold (i.e., clamp) the coated part C of the optical fiber F1 or F2 between the second clamp 15 and the lower clamp 12. Also, the second clamp 15 can switch between a state in which the optical fiber F1 or F2 is held and a state in which it is not held by opening and closing the upper surface of the lower clamp 12.

A magnet is provided in one of the second clamp 15 and the lower clamp 12, and a portion (such as an iron material) that is magnetically attracted to the magnet is provided in the other thereof. Therefore, in a state in which the second clamp 15 is close to the upper surface of the lower clamp 12, a downward force (magnetic force) acts on the second clamp 15. The magnetic force serves as a force (closing force) acting to close the second clamp 15, and a state in which the second clamp 15 is closed is maintained. Although not shown, the second clamp 15 includes a pressing piece that comes into contact with the optical fiber F1 or F2, and a downward force is applied to the pressing piece by a compression spring. Therefore, in a state in which the second clamp 15 is closed, the pressing piece presses the optical fiber F1 or F2 with a predetermined force due to the compression spring.

As shown in FIG. 2, the second clamp 15 includes an engaging part 15*a* that covers a portion of the third clamp 16 from above. In the example of FIG. 2, the engaging part 15*a* protrudes inward in the left-right direction X from the second clamp 15.

Figure 4A:
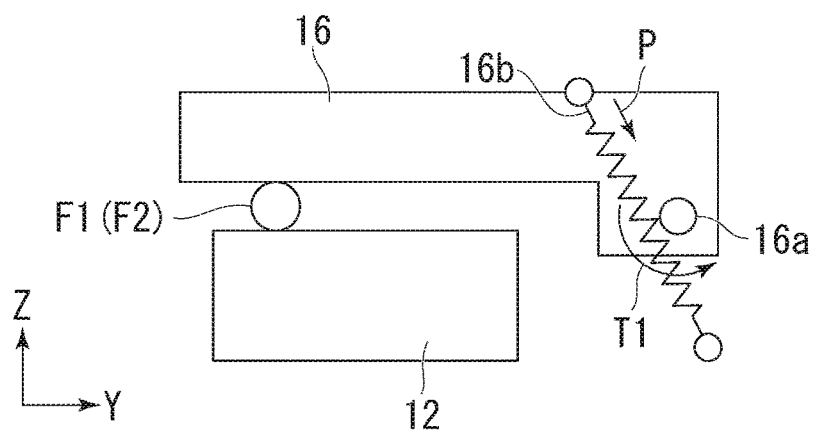
FIG. 4A is a cross-sectional view taken in a direction of arrow IV-IV in FIG. 2.

The third clamp 16 is positioned between the first clamp 14 and the second clamp 15 in the left-right direction X and is positioned above the lower clamp 12. As shown in FIG. 4A, the third clamp 16 includes a rotating shaft 16*a* different from the second clamp 15. Therefore, the third clamp 16 is rotatable independently of the second clamp 15. A tension spring 16*b* that applies a biasing force to the third clamp 16 is provided in a vicinity of the rotating shaft 16*a* of the third clamp 16.

An operation of the engaging part 15*a* will be described with reference to FIG. 2. When the second clamp 15 is closed, the engaging part 15*a* comes into contact with the third clamp 16 and pushes the third clamp 16, and thereby the third clamp 16 also is closed. On the other hand, when the second clamp 15 is opened, the engaging part 15*a* is separated upward from the third clamp 16. Therefore, the third clamp 16 is in conjunction with an operation of closing the second clamp 15 but is not in conjunction with an operation of opening the second clamp 15.

As shown in FIG. 3, the pair of electrode rods 17 are disposed at a distance from each other in the front-rear direction Y. Each of the electrode rods 17 has a tapered shape in which an outer diameter decreases toward an inward side (a side closer to the optical fibers F1 and F2) in the front-rear direction Y. When abutting surfaces of the optical fibers F1 and F2 are disposed between the electrode rods 17 and electrical discharge is performed toward the abutting surfaces, distal ends of the optical fibers F1 and F2 can be heated and fusion-spliced. That is, the heater 2*a* of the first embodiment is constituted by the pair of electrode rods 17. Furthermore, a heater or the like may be used instead of the electrode rods 17 as the heater 2*a*.

As shown in FIG. 3, the fusion splicer 1 includes an imaging unit 20 that images a fusion splice portion of the optical fibers F1 and F2. The imaging unit 20 includes a pair of cameras 21, a pair of light sources 22, and a pair of lenses 23. The camera 21 images the fusion splice portion (the glass part G) of the optical fibers F1 and F2. Images captured are input to a loss calculator provided in the fusion splicer 1. The loss calculator can calculate an estimated value of light transmission loss (hereinafter, simply referred to as a splice loss) in the fusion splice portion on the basis of the images. Also, the fusion splicer 1 can display the images captured by the camera 21 and the splice loss on a display 2*b* (see FIG. 2). The loss calculator may be a portion of the controller U described above.

As shown in FIG. 3, the pair of cameras 21 are disposed at a distance from each other in the front-rear direction Y.

The lenses 23 are each disposed between the cameras 21 and the glass parts G. The cameras 21 image the glass parts G via the lenses 23. The pair of light sources 22 are disposed on an inward side of the windproof cover 3. When the light sources 22 irradiate the glass parts G with light, the cameras 21 can clearly image the glass parts G. As the light source 22, for example, a light emitting diode or the like can be appropriately used. Furthermore, the light sources 22 may be turned on at least when the cameras 21 image the optical fibers F1 and F2. Therefore, for example, the light sources 22 may be turned on only when the optical fibers F1 and F2 are imaged by the cameras 21 and may be turned off at other times.

Next, an operation of the fusion splicer 1 configured as described above will be described.

At the time of fusing-splicing the optical fibers F1 and F2 using the fusion splicer 1, a state in which the windproof cover 3 is open, and the first clamp 14, the second clamp 15, and the third clamp 16 are open is set. In this state, the optical fibers F1 and F2 are placed on the lower clamps 12 and the glass holders 13. More specifically, the coated parts C of the optical fibers F1 and F2 are placed on the lower clamps 12, and the glass parts G are placed in the grooves 13*a* of the glass holders 13. Furthermore, the optical fibers F1 and F2 are each put into a state in which a portion of the coated part C is removed in advance and the glass part G is exposed. Also, as shown in FIG. 2, a region in which only the second coating layer C2 of the coated part C is removed and the first coating layer C1 is exposed may be provided. In this case, a portion in which the first coating layer C1 is exposed is disposed below the third clamp 16, and a portion in which the second coating layer C2 remains is disposed below the second clamp 15.

Next, the windproof cover 3, the first clamp 14, the second clamp 15, and the third clamp 16 are closed by operating a touch panel provided on the display 2*b* or operating a button provided on the device main body 2. Specifically, a close signal is output to the cover driver M1 and the clamp driver M2 from the controller U. When the windproof cover 3 is closed by power of the cover driver M1, the pair of first clamps 14 also are closed in conjunction with the windproof cover 3. When the second clamp 15 is closed by power of the clamp driver M2, the engaging part 15*a* included in the second clamp 15 pushes the third clamp 16. Therefore, the third clamp 16 also is closed in conjunction with the second clamp 15.

As shown in FIG. 4A, in a state in which the third clamp 16 is closed, a moment T1 around the rotating shaft 16*a* in a direction to close the third clamp 16 is generated by a spring force P exerted by the tension spring 16b. Due to the moment T1, the optical fiber F1 or F2 reaches a state of being pressed downward by the third clamp 16. Also, the moment T1 acts as a force (closing force) acting to close the third clamp 16. Here, the third clamp 16 serves the role of preventing the optical fiber F1 or F2 from freely moving when the first clamp 14 and the second clamp 15 are opened. On the other hand, the second clamp 15 serves the role of fixing the optical fiber F1 or F2 at the time of fusion-splicing. Since the roles thereof are different from each other as described above and the third clamp 16 is manually opened and closed, the closing force of the third clamp 16 may be smaller than the closing force of the second clamp 15.

Next, the movable stages 11 move inward in the left-right direction X, and the glass parts G of the optical fibers F1 and F2 are made to abut against each other. In a state in which the glass parts G abut against each other, electric power is supplied to the heaters 2a (the electrode rods 17), and the glass parts G are heated and melted. Therefore, the glass parts G of the optical fibers F1 and F2 are integrated and fusion-spliced. When the glass parts G are melted, if wind hits the electrode rods 17 or the glass parts G, a state of the fusion splicing becomes unstable. On the other hand, when the fusion splicing is performed with the windproof cover 3 closed, wind hitting around the electrode rods 17 can be inhibited and a state of fusion-splicing can be stabilized.

After the fusion splicing, a splice loss may be calculated by the loss calculator. The calculation of the splice loss is performed on the basis of images of the fusion splice portion captured by the imaging unit 20. The calculation result of the splice loss is displayed on the display 2b. The loss calculator may be a portion of the controller U or a part different from the controller U.

After calculation of the splice loss, a proof test may be performed. The proof test is performed by moving the movable stages 11 outward in the left-right direction X and applying a predetermined tensile force to the fusion splice portion. Results of the proof test are displayed on the display 2b. The calculation of the splice loss and the proof test may not be performed.

The controller U opens the windproof cover 3 by driving the cover driver M1 after the fusion-splicing, after calculation of the splice loss is performed, or after the proof test is performed. At this time, the first clamp 14 also is opened in conjunction with the windproof cover 3. The controller U may open the second clamp 15 by driving the clamp driver M2 after the windproof cover 3 is opened. Since the second clamp 15 serves the role of fixing the optical fiber F1 or F2 at the time of fusion-splicing, a magnetic force (closing force) acting on the second clamp 15 is large. Accordingly, when the second clamp 15 is opened automatically by the clamp driver M2, operability is improved compared to a case in which a user manually opens the second clamp 15.

Here, in the first embodiment, a state in which the third clamps 16 are closed continues even after the windproof cover 3, the first clamps 14, and the second clamps 15 are opened. Then, the third clamps 16 in the closed state restrict movement of one or both of the optical fibers F1 and F2. Therefore, the optical fibers F1 and F2 moving freely after the fusion splicing is restricted, and the glass parts G (the fusion splice portion) coming into contact with constituent members of the fusion splicer 1 other than the third clamps 16 or the glass parts G being bent and causing decrease in reliability of optical transmission can be inhibited. Particularly, since the second clamp 15 is closed by the magnetic force as described above, when the second clamp 15 is automatically opened by the cover driver M1, there are cases in which the second clamp 15 is flipped up vigorously. Movement of the optical fibers F1 and F2 due to an impact at this time can also be inhibited by the third clamps 16.

Furthermore, the pair of third clamps 16 are provided in the fusion splicer 1 of the first embodiment, but only one third clamp 16 may be provided therein. Even in this case, when the third clamp 16 is in contact with any one of the optical fibers F1 and F2, the optical fibers F1 and F2 moving freely can be restricted. Also, the third clamps 16 do not necessarily need to be in contact with the optical fibers F1 and F2 in the closed state. For example, even when there are gaps between the third clamps 16 in the closed state and the optical fibers F1 and F2, since the optical fibers F1 and F2 come into contact with the third clamps 16 when they try to move upward, movement of the optical fibers F1 and F2 can be restricted. Particularly, when the third clamp 16 is positioned above the glass part G, a gap is provided between the glass part G and the closed third clamp 16, and thereby a pressing force (closing force) of the third clamp 16 directly acting on the glass part G can be avoided. A buffer member (rubber or the like) may be provided in a portion of the third clamp 16 in contact with the optical fiber F1 or F2. In this case, even when the third clamp 16 is disposed above the glass part G, the glass part G being damaged or the like due to contact between the third clamp 16 and the glass part G can be inhibited.

Figure 4B:
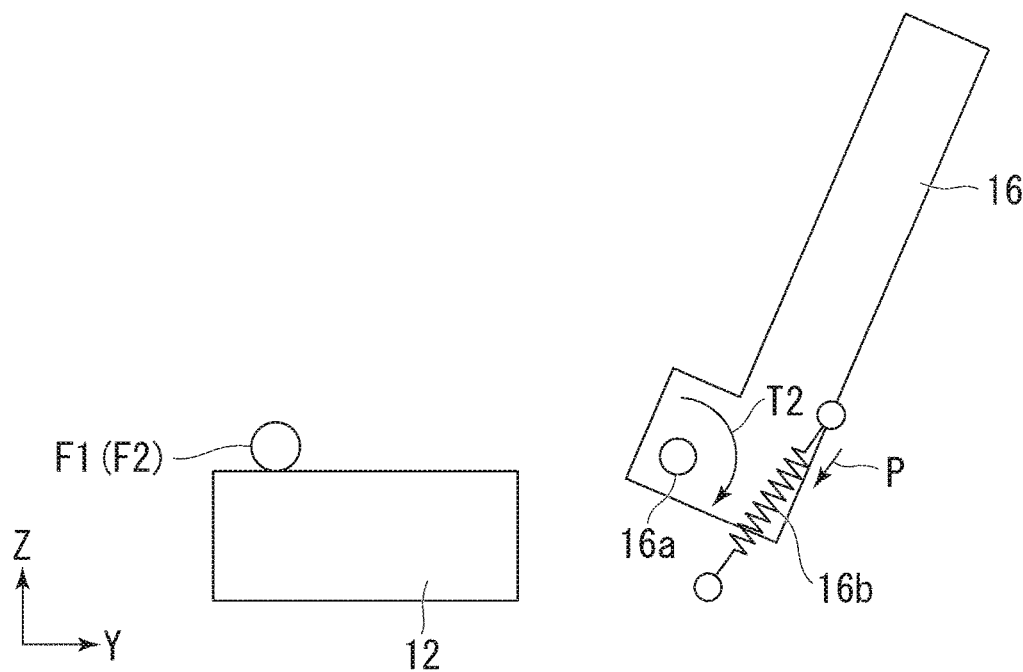
FIG. 4B is a cross-sectional view showing a state in which a third clamp of FIG. 4A is open.

When the optical fibers F1 and F2 are removed from the fusion splicer 1, the third clamps 16 may be manually opened. Since the third clamp 16 is closed with a weak biasing force by the tension spring 16b, the user can open the third clamp 16 with a small operating force. Therefore, when the third clamps 16 are opened, movement of the optical fibers F1 and F2 due to impacts exerted on the optical fibers F1 and F2 can be inhibited. As shown in FIG. 4B, when the third clamp 16 is rotated by a predetermined amount around the rotating shaft 16a, the spring force P due to the tension spring 16b generates a moment T2 that rotates the third clamp 16 in an opening direction. Since the third clamp 16 is caused to remain in the open state due to the moment T2, the user can release his/her hand from the third clamp 16 and pick up the optical fibers F1 and F2.

As described above, the fusion splicer 1 of the first embodiment includes the device main body 2 having the heater 2a which heats the pair of optical fibers F1 and F2, the pair of glass holders 13 on which the grooves 13a that place the respective glass parts G of the optical fibers F1 and F2 thereon are formed, the pair of openable and closable first clamps 14 which hold the glass parts G between the first clamps 14 and the glass holders 13, the pair of openable and closable second clamps 15 which press the respective coated parts C of the optical fibers F1 and F2 from above, the openable and closable third clamp 16 fixed to the device main body 2 and configured to restrict movement of at least one of the pair of optical fibers F1 and F2 in a closed state, and an openable and closable windproof cover 3 that covers the heater 2a, the pair of glass holders 13, the pair of first clamps 14, the pair of second clamps 15, and the third clamps 16. Also, the device main body 2 includes the cover driver M1 that opens and closes the windproof cover 3 and the clamp driver M2 that opens and closes the pair of second clamps 15, in which an opening and closing operation of the pair of first clamps 14 is configured to be in conjunction with an opening and closing operation of the windproof cover 3, and the third clamp 16 is configured to maintain the closed state even after the windproof cover 3 is opened. The optical fibers F1 and F2 moving freely even after the windproof cover 3 is opened can be restricted by the third clamp 16.

Also, the closing force of the third clamp 16 is smaller than the closing force of the second clamp 15. Therefore, the user can manually open the third clamp 16 with a small operating force. Accordingly, when the third clamp 16 is opened, an impact applied to the optical fiber F1 or F2 can be reduced, and unexpected movement of the optical fiber F1 or F2 can be more reliably inhibited.

Also, the second clamp 15 includes the engaging part 15a that covers at least a portion of the third clamp 16 from above. Therefore, the third clamp 16 can be closed in conjunction with a closing operation of the second clamp 15, and operability can be further improved. Also, since the engaging part 15a covers the third clamp 16 from above, the third clamp 16 cannot be in conjunction with an opening operation of the second clamp 15.

Also, the coated part C includes the first coating layer C1 and the second coating layer C2 positioned on an outward side of the first coating layer C1, and the third clamp 16 is positioned between the first clamp 14 and the second clamp 15 in the left-right direction X in which the optical fibers F1 and F2 extend. Then, the third clamp 16 comes into contact with the first coating layer C1, and the second clamp 15 comes into contact with the second coating layer C2. According to this configuration, the third clamps 16 come into contact with the optical fibers F1 and F2 at positions close to the fusion splice portion, and thus unexpected movement of the fusion splice portion can be more reliably inhibited.

Also, the fusion splicer 1 further includes the controller U that controls the cover driver M1 and the clamp driver M2. Then, the controller U may be configured to open the windproof cover 3, the pair of first clamps 14, and the pair of second clamps 15 by driving the cover driver M1 and the clamp driver M2 after the optical fibers F1 and F2 are fusion-spliced, after calculation of the splice loss is performed, or after the proof test is performed. In this case, since the second clamp 15 or the like is automatically opened, operability can be further improved. Also, the fusion splicer 1 which is excellent in that the third clamps 16 can restrict movement of the optical fibers F1 and F2 while improving operability as described above can be realized.

Second Embodiment

Next, a second embodiment according to the invention will be described, but basic configurations are the same as those in the first embodiment. Therefore, constituents which are the same are denoted by the same reference numerals, description thereof will be omitted, and only different points will be described.

A fusion splicer 1 of the second embodiment is different from the first embodiment in that a switching part 18 is provided instead of the engaging part 15a of the second clamp 15.

Figure 5A:
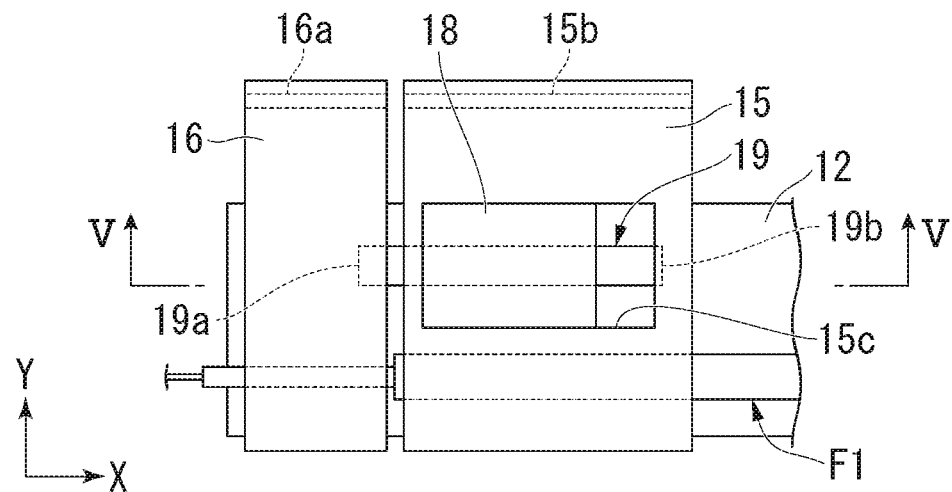
FIG. 5A is a plan view of a vicinity of a second clamp of a fusion splicer according to a second embodiment.
Figure 5B:
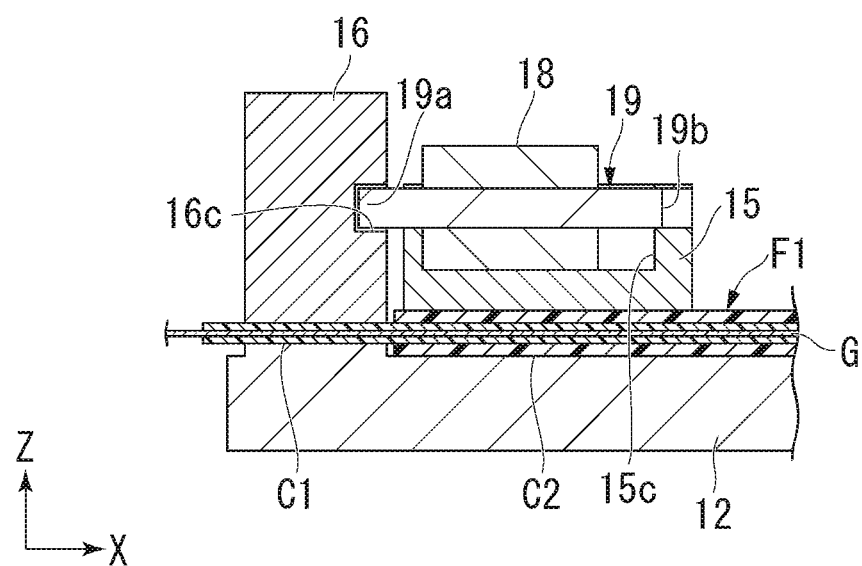
FIG. 5B is a cross-sectional view taken in a direction of arrow V-V in FIG. 5A.

FIG. 5A is a plan view of a vicinity of a second clamp 15 of the second embodiment from above. FIG. 5B is a cross-sectional view taken in a direction of arrow V-V of FIG. 5A. Furthermore, FIGS. 5A and 5B show one side (optical fiber F1 side) of a pair of second clamps 15 provided in the fusion splicer 1. Although illustration and description are omitted, the second clamp 15 on the other side (optical fiber F2 side) has the same configurations as those described below.

As shown in FIGS. 5A and 5B, the switching part 18 is attached to the second clamp 15 of the second embodiment. A guide groove 15c extending in a left-right direction X is formed on the second clamp 15, and the switching part 18 is slidably movable along the guide groove 15c. Therefore, the switching part 18 is slidably movable in the left-right direction X with respect to the second clamp 15.

The switching part 18 includes a connecting part 19. The connecting part 19 of the second embodiment is a shaft extending in the left-right direction X and penetrates the switching part 18 in the left-right direction X. The connecting part 19 has a first end 19a and a second end 19b in the left-right direction X. The first end 19a protrudes toward a third clamp 16 side from the switching part 18. The second end 19b protrudes toward a side opposite to the third clamp 16 from the switching part 18.

As shown in FIG. 5B, the third clamp 16 has a recessed part 16c. The recessed part 16c is disposed at a same position as the connecting part 19 in a vertical direction Z and a front-rear direction Y. In the state shown in FIGS. 5A and 5B (hereinafter, referred to as a connected state), the first end 19a of the connecting part 19 is inserted into the recessed part 16c. Therefore, when the second clamp 15 rotates around a rotating shaft 15b, the third clamp 16 also rotates around a rotating shaft 16a. In the connected state, unlike the first embodiment, the third clamp 16 is in conjunction with the second clamp 15 both when the second clamp 15 opens and when it closes.

Figure 6A:
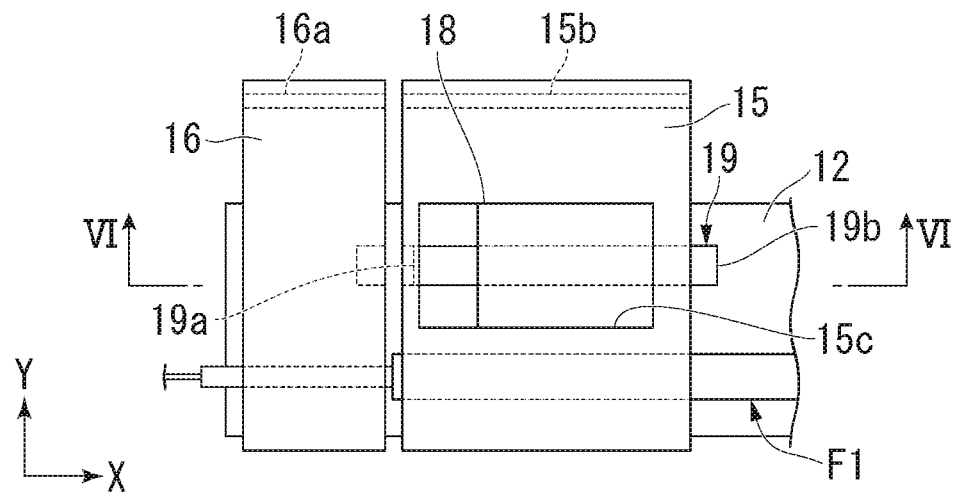
FIG. 6A is a plan view showing a state in which a switching part of FIG. 5A has been slid.
Figure 6B:
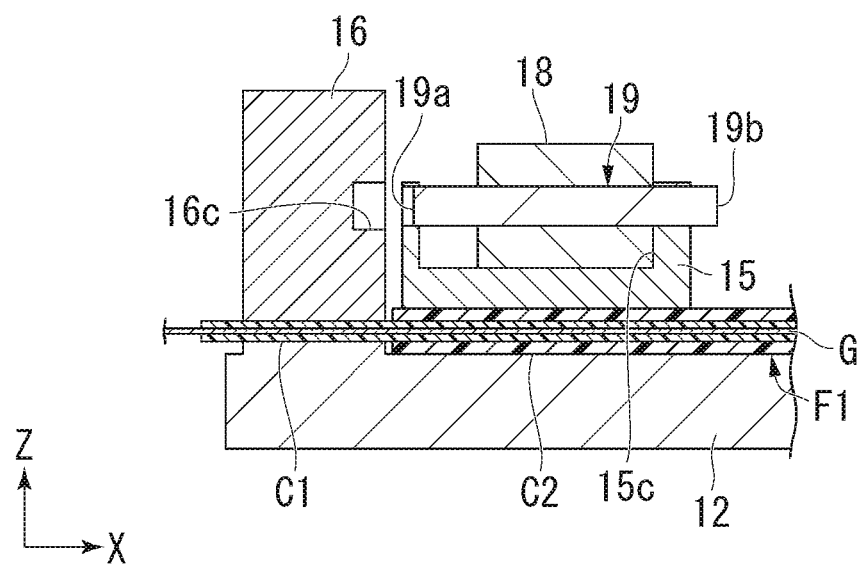
FIG. 6B is a cross-sectional view taken in a direction of arrow VI-VI in FIG. 6A.

When the switching part 18 is slid in the left-right direction X with respect to the second clamp 15 from the connected state shown in FIGS. 5A and 5B, a state shown in FIGS. 6A and 6B (hereinafter, referred to as an unconnected state) is obtained. In the unconnected state, the first end 19a of the connecting part 19 is separated from the recessed part 16c. Therefore, even when the second clamp 15 rotates, the third clamp 16 does not rotate. In the unconnected state, unlike the first embodiment, the third clamp 16 is not in conjunction with the second clamp 15 both when the second clamp 15 opens and when it closes.

Furthermore, in both the connected state (FIG. 5B) and the unconnected state (FIG. 6B), a portion of the first end 19a and a portion of the second end 19b are disposed on an inward side of a hole formed in the second clamp 15. Therefore, the switching part 18 being separated upward from the second clamp 15 is restricted. That is, the connecting part 19 of the second embodiment also has a role of restricting falling off of the switching part 18 from the second clamp 15 in addition to a role of switching between the connected state and the unconnected state.

As described above, the fusion splicer 1 of the second embodiment includes the switching part 18 capable of switching an opening and closing operation of the third clamp 16 between a state (connected state) of being in conjunction with and a state (unconnected state) of not being in conjunction with an opening and closing operation of the second clamp 15. Therefore, for example, in a case in which a likelihood of the optical fiber F1 or F2 moving due to an impact when the second clamp 15 is opened is low, the third clamp 16 can be configured to be opened in conjunction with the second clamp 15. Also, in a case in which a likelihood of the optical fiber F1 or F2 moving due to an impact when the second clamp 15 is opened is high, the third clamp 16 can be configured not to be opened in conjunction with the second clamp 15. As described above, operability can be further improved by giving the user room for selection.

Furthermore, a shape of the connecting part 19 can be changed as appropriate. For example, the connecting part 19 may be formed integrally with the switching part 18. Also in this case, the same function can be realized as long as portions corresponding to the first end 19a and the second end 19b protrude from both side surfaces (both end surfaces in the left-right direction X) of the switching part 18.

Third Embodiment

Next, a third embodiment according to the invention will be described, but basic configurations are the same as those in the first embodiment. Therefore, constituents which are the same are denoted by the same reference numerals, description thereof will be omitted, and only different points will be described.

As shown in FIG. 7, a splicing structure 10 of the third embodiment includes a pair of fiber holders 30 instead of the pair of lower clamps 12 (see FIG. 2) in the first embodiment. The fiber holders 30 are configured to be attachable to and detachable from movable stages 11 provided in a device main body 2. In the third embodiment, third clamps 16 are attached to the device main body 2 and second clamps 15 are attached to the fiber holders 30. Therefore, when the fiber holders 30 are removed from the device main body 2, the second clamps 15 also are removed from the device main body 2. Furthermore, it is the same as the first embodiment in that first clamps 14 are attached to a windproof cover 3.

Here, the third clamps 16 have a role of restricting movement of the optical fibers F1 and F2 after fusion splicing is performed as described above. Even if there is no member for sandwiching the optical fibers F1 and F2 below the third clamps 16, when the third clamps 16 are in contact with at least one of the optical fibers F1 and F2 from above, movement of the optical fibers F1 and F2 can be restricted. Therefore, as shown in FIG. 7, a space below the third clamps 16 may be an empty space.

According to the third embodiment, the fiber holder 30 and the second clamp 15 are attachable to and detachable from the device main body 2. Therefore, the optical fiber F1 or F2 is sandwiched between the fiber holder 30 and the second clamp 15 on an outward side of the device main body 2, and in this state, a portion of the coated part C can be removed and the optical fiber F1 or F2 can be cut at a predetermined length. Then, the optical fiber F1 or F2 for each fiber holder 30 can be mounted on the device main body 2 in a state in which a glass part G is exposed by the predetermined length.

The technical scope of the invention is not limited to the above-described embodiments, and various modifications may be made without departing from the scope of the invention.

For example, one or both of the pair of lower clamps 12 in the first embodiment may be replaced with the fiber holder 30 in the third embodiment. It may be configured such that both the lower clamp 12 and the fiber holder 30 are made to be attachable to and detachable from the movable stage 11 so that the lower clamp 12 or the fiber holder 30 can be selectively used.

Also, in the fusion splicer 1 of the first embodiment, the lower clamp 12 may be simply fixed to the movable stage 11 without causing the lower clamp 12 to be attachable to and detachable from the movable stage 11.

In addition, the components in the above-described embodiments can be appropriately replaced with well-known components without departing from the spirit and scope of the invention, and furthermore, the above-described embodiments or modified examples may be appropriately combined.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Fusion splicer
2 Device main body
2a Heater
3 Windproof cover
13 Glass holder
13a Groove
14 First clamp
15 Second clamp
15a Engaging part
16 Third clamp
18 Switching part
C Coated part
C1 First coating layer
C2 Second coating layer
F1, F2 Optical fiber
G Glass part
M1 Cover driver
M2 Clamp driver
U Controller

The invention claimed is:

1. A fusion splicer comprising:
    a device main body comprising a heater that heats a pair of optical fibers that each comprise a glass part and a coated part;
    a pair of glass holders each comprising a groove on which the respective glass part is disposed;
    a pair of first clamps that each clamp the respective glass part against the respective glass holder;
    a pair of second clamps that each clamp the respective coated part from above;
    a third clamp that is fixed to the device main body and that restricts movement of at least one of the optical fibers in a closed state; and
    a windproof cover that covers the heater, the glass holders, the first clamps, the second clamps, and the third clamp, wherein
    the device main body further comprises:
        a cover driver that opens and closes the windproof cover; and
        a clamp driver that opens and closes the second clamps,
    an opening and closing operation of the first clamps is in conjunction with an opening and closing operation of the windproof cover, and
    the third clamp maintains the closed state even after the windproof cover is opened.

2. The fusion splicer according to claim 1, wherein a closing force of the third clamp is less than a closing force of the second clamps.

3. The fusion splicer according to claim 1, wherein the second clamps each comprise an engaging part that covers at least a portion of the third clamp from above.

4. The fusion splicer according to claim 1, further comprising a switching part that switches an opening and closing operation of the third clamp between a state of being in conjunction with and a state of not being in conjunction with an opening and closing operation of the second clamps.

5. The fusion splicer according to claim 1, wherein
    the third clamp is disposed between one of the first clamps and one of the second clamps in a left-right direction in which the optical fibers extend, each of the coated parts comprises:
a first coating layer; and
a second coating layer outside of the first coating layer,
the third clamp comes into contact with the first coating layer, and
the one of the second clamps comes into contact with the second coating layer.

6. The fusion splicer according to claim 1, further comprising:
a controller that controls the cover driver and the clamp driver, wherein
the controller opens the windproof cover, the first clamps, and the second clamps by driving the cover driver and the clamp driver after:
the optical fibers are fusion-spliced,
after a splice loss is calculated, or
after a proof test is performed.

* * * * *